(12) United States Patent
de Swardt (10) Patent No.: US 11,491,554 B2
(45) Date of Patent: Nov. 8, 2022

(54) COMPACT FLEXIBLE IMPACT BIT HOLDER

(71) Applicant: APEX BRANDS, INC., Apex, NC (US)

(72) Inventor: Rolf Reitz de Swardt, Blythewood, SC (US)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 16/929,473

(22) Filed: Jul. 15, 2020

(65) Prior Publication Data

US 2021/0016367 A1 Jan. 21, 2021

Related U.S. Application Data

(60) Provisional application No. 62/875,628, filed on Jul. 18, 2019.

(51) Int. Cl.
*B23B 31/00* (2006.01)
*B23B 31/08* (2006.01)
(Continued)

(52) U.S. Cl.
CPC ............ *B23B 31/08* (2013.01); *B23B 31/008* (2013.01); *B25B 23/0035* (2013.01); *B25B 23/141* (2013.01)

(58) Field of Classification Search
CPC ............. Y10S 279/904; B23B 2250/16; B23B 27/002; B23B 31/008; B23B 2260/068;
(Continued)

(56) References Cited

U.S. PATENT DOCUMENTS 1,369,491 A * 2/1921 Straehle .................. B23B 31/08
  279/16
2,671,484 A 3/1954 Clark
(Continued)

FOREIGN PATENT DOCUMENTS

| EP | 2098336 A3 | 10/2011 |
| WO | 2012049078 A1 | 4/2012 |
| WO | 2018204468 A1 | 11/2018 |

OTHER PUBLICATIONS

International Search Report Written Opinion from related US Application No. PCT/US2021/049374 dated Sep. 24, 2021, all pages cited in its entirety.
(Continued)

*Primary Examiner* — Chwen-Wei Su
(74) *Attorney, Agent, or Firm* — Burr & Forman UIP (57) ABSTRACT

A flexible bit holder may include a drive body having a receiving orifice formed therein, a drive body having a shank and a flexion assembly. The receiving orifice may be configured to receive a bit, and the shank may be configured to interface with a driver to receive rotational energy from the driver. The flexion assembly may be disposed between at least a portion of the drive body and the driven body to operably couple the drive body and driven body. The flexion assembly may be configured to transfer torque applied to the driven body by the driver to the drive body. The flexion assembly may be formed of flexible material such that the drive body is rotatable relative to the driven body about a common axis of the drive body and the driven body.

16 Claims, 7 Drawing Sheets

(51) Int. Cl.
*B25B 23/14* (2006.01)
*B25B 23/00* (2006.01)

(58) Field of Classification Search
CPC ....... B23B 31/08; Y10T 408/76; B25B 19/00; B25B 23/141; B25B 23/1405; B25B 23/0035
See application file for complete search history.

(56) References Cited

U.S. PATENT DOCUMENTS

| | | | |
|---|---|---|---|
| 3,630,108 A | 12/1971 | Stillwagon | |
| 3,744,350 A * | 7/1973 | Raff | B25B 13/06 81/477 |
| 3,874,194 A | 4/1975 | Filepp | |
| 5,180,042 A | 1/1993 | Ogiso | |
| 5,868,047 A | 2/1999 | Faust et al. | |
| D410,372 S | 6/1999 | Strauch | |
| 6,105,473 A | 8/2000 | Shiu | |
| 6,330,846 B1 * | 12/2001 | Strauch | B25B 23/0035 81/467 |
| 6,345,560 B1 | 2/2002 | Strauch | |
| 6,640,911 B2 * | 11/2003 | Lieser | B25B 13/06 175/170 |
| 6,684,740 B2 | 2/2004 | Lin | |
| 7,096,768 B1 | 8/2006 | Chen | |
| 7,261,023 B2 | 8/2007 | Taguchi | |
| 7,469,909 B2 | 12/2008 | Strauch | |
| 7,597,031 B2 | 10/2009 | Chiang | |
| D623,036 S | 9/2010 | DeBaker | |
| 7,810,817 B1 | 10/2010 | Gao | |
| 8,109,183 B2 | 2/2012 | Santamarina et al. | |
| 8,117,950 B2 | 2/2012 | Kozak | |
| 8,172,236 B2 | 5/2012 | Shibata | |
| 8,226,337 B2 * | 7/2012 | Komine | B23B 31/08 408/238 |
| 8,695,461 B2 | 4/2014 | Moss | |
| D711,719 S | 8/2014 | DeBaker | |
| 8,876,120 B2 | 11/2014 | Chen | |
| 8,955,418 B2 | 2/2015 | Peters et al. | |
| 9,095,961 B1 | 8/2015 | Lenfest | |
| 9,107,721 B2 | 8/2015 | Plotkin | |
| D752,408 S | 3/2016 | Moss et al. | |
| 9,283,661 B2 | 3/2016 | Cummings et al. | |
| 9,469,017 B2 * | 10/2016 | Seith | B25B 13/06 |
| 9,649,696 B2 * | 5/2017 | Teusch | B23B 31/083 |
| D789,761 S | 6/2017 | Moss et al. | |
| 9,695,882 B2 | 7/2017 | Jakoubek | |
| 9,764,452 B2 | 9/2017 | Koch | |
| 9,943,946 B2 | 4/2018 | Peters | |
| 10,022,845 B2 | 7/2018 | Neitzell | |
| 10,166,657 B2 | 1/2019 | Cummings et al. | |
| 10,245,646 B2 | 4/2019 | Hu | |
| 10,376,964 B2 * | 8/2019 | Fronius | B23B 31/1179 |
| 10,513,017 B2 | 12/2019 | Lourenco | |
| 10,568,391 B2 * | 2/2020 | Glancy | A43C 15/161 |
| 10,991,489 B2 | 4/2021 | Schneider et al. | |
| 11,059,151 B2 | 7/2021 | Cummings et al. | |
| 2006/0230887 A1 | 10/2006 | Taguchi | |
| 2007/0099712 A1 | 5/2007 | Smihal | |
| 2007/0234856 A1 | 10/2007 | Liu | |
| 2009/0311061 A1 * | 12/2009 | Santamarina | B25B 23/0035 408/239 A |
| 2010/0064860 A1 | 3/2010 | Kozak | |
| 2011/0036212 A1 | 2/2011 | Santamarina et al. | |
| 2011/0170964 A1 * | 7/2011 | Rabate | B23B 29/125 408/17 |
| 2016/0038210 A1 | 2/2016 | Plotkin | |
| 2016/0325411 A1 | 11/2016 | Wang | |
| 2019/0232470 A1 | 8/2019 | Xu | |
| 2019/0293041 A1 * | 9/2019 | Dong | F02N 11/087 |
| 2020/0215675 A1 | 7/2020 | Hawkins | |
| 2021/0331302 A1 | 10/2021 | Fairchild et al. | |

OTHER PUBLICATIONS

Non-Final Office Action from related U.S. Appl. No. 17/368,489 dated Oct. 4, 2021, all pages cited in its entirety.

International Search Report Written Opinion from International Application No. PCT/US2021/049371 dated Dec. 21, 2021, all pages cited in its entirety.

* cited by examiner

COMPACT FLEXIBLE IMPACT BIT HOLDER

PRIORITY CLAIM

This application claims priority to U.S. Provisional Application No. 62/875,628 filed on Jul. 18, 2019, which is expressly incorporated by reference herein in its entirety.

TECHNICAL FIELD

Example embodiments generally relate to driving tools and, in particular, relate to a bit holder that is configured to flex in order to protect the bit from damage when receiving high torque.

BACKGROUND

Cordless impact drivers have become very common in the last decade or so. Many of these impact drivers are configured to interface with a standard bit having a ¼ inch hex shank. It is also common for an extension to be used to hold the bit and improve the ability of the impact driver to access certain screws (e.g., recessed screws). One challenge that arises in this context is that standard ¼ inch hex bits are generally hardened so that they do not wear away on the head of the screw that is being engaged by the bit. This hardening tends to also make the bit brittle. As such, standard ¼ inch hex bits tend to have a limited life span when driven by an impact driver. In this regard, under high torque loads that can be generated by the impact driver, some of the bits will break. In particular, in response to pulses of energy, the bits may break due to instantaneous high torque and twisting forces experienced by the bit.

Accordingly, it may be desirable to provide a solution for using standard ¼ inch hex bits (or other bits) with a driver while mitigating the risk of breaking the bit.

BRIEF SUMMARY OF SOME EXAMPLES

Some example embodiments may enable the provision of a bit holder that is structured to enable the bit holder to flex to at least some degree. Flexing of the bit holder may prevent the damage to the bit under stress.

In an example embodiment, a flexible bit holder may be provided. The flexible bit holder may include a drive body having a receiving orifice formed therein, a drive body having a shank and a flexion assembly. The receiving orifice may be configured to receive a bit, and the shank may be configured to interface with a driver to receive rotational energy from the driver. The flexion assembly may be disposed between at least a portion of the drive body and the driven body to operably couple the drive body and driven body. The flexion assembly may be configured to transfer torque applied to the driven body by the driver to the drive body. The flexion assembly may be formed of flexible material such that the drive body is rotatable relative to the driven body about a common axis of the drive body and the driven body.

In another example embodiment, a flexion assembly is provided. The flexion assembly may operably couple a drive body having a receiving orifice formed therein and configured to receive a bit to a driven body having a shank that is configured to interface with a driver to receive rotational energy from the driver. The flexion assembly may be disposed between at least a portion of the drive body and the driven body to transfer torque applied to the driven body by the driver to the drive body. The flexion assembly may be formed of flexible material such that the drive body is rotatable relative to the driven body about a common axis of the drive body and the driven body.

In another example embodiment, a method of providing an improved bit holder is provided. The method may include providing drive ridges aligned with a common axis on an internal surface of a drive body having a cavity formed therein and providing torque transfer ridges on an external surface of a core member of a driven body. The method may further include inserting flex members on the core member adjacent to each opposing lateral side of the torque transfer ridges to form receiving slots and aligning the drive ridges with the receiving slots. The method may also include inserting the drive body into the receiving slots as the drive body and the driven body are compressed toward each other along the common axis until the drive body and driven body are fixed in axial position relative to each other.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a bit holder that is configured to flex to mitigate the risk of breaking a bit being driven (e.g., by an impact driver or other driving tool). Although the problem of breaking bits during driving could perhaps be mitigated by making a bit that is enabled to twist, doing so would likely require the length of the bit to be increased to allow a section that can twist to be inserted (instead of simply having a "thick" bit, which is standard). This would also inevitably drastically increase the cost of the bit. Accordingly, it may be preferable to instead modify the bit holder so that standard "thick" bits, which are quite ubiquitous in tool kits, could continue to be used with reduced risk of breakage. Thus, instead of replacing many different standard bits (e.g., one for each possible different size and shape of drive head) with corresponding expensive twistable bits, one improved device (i.e., the improved bit holder) can be purchased by users.

Figure 1:
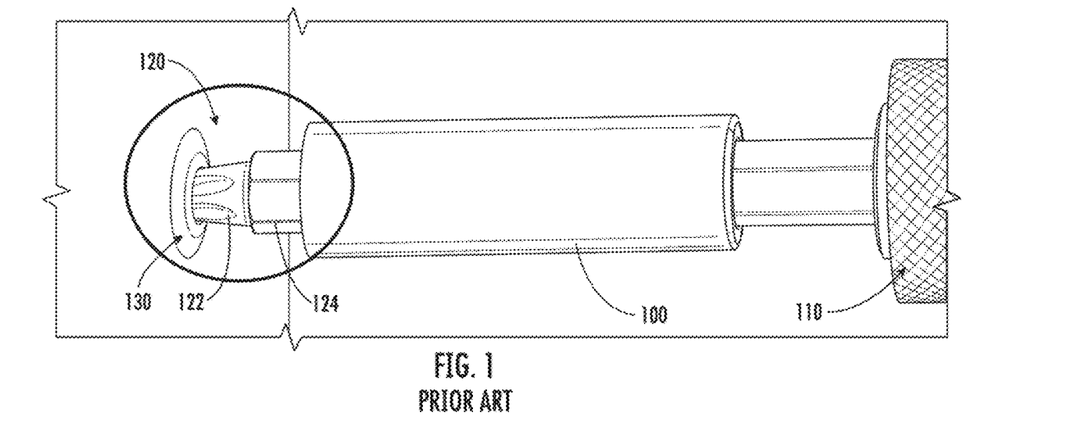
FIG. 1 is a side view of a prior art bit holder.

FIG. 1 is a side view of a prior art bit holder 100 used with a driver 110 (e.g., an impact driver) to hold and drive a bit 120. The bit 120 is engaged with a screw 130. In this regard, the bit 120 of this example includes a Phillip-head (or "crosshead") 122 and a standard ¼ inch hex shank 124. However, it should be appreciated that other bits may include different shapes and sizes of heads along with the standard ¼ inch hex shank to enable interface with the bit holder 100 of FIG. 1.

As noted above, given that the bit 120 is generally hardened, the application of large torque by the driver 110 may cause the bit 120 to break. In particular, the rigid connection between the drive end of the bit holder 100 and the ¼ inch hex shank 124 exacerbates this potential since pulses of drive energy that may be applied by the driver 110 are instantaneously communicated to the bit 120. Accordingly, example embodiments may provide an improved bit holder that changes this situation to mitigate the risk of breaking the bit 120. In this regard, the improved bit holder may include a flexion assembly that allows some flexing of the bit holder so that pulses of drive energy are not immediately and instantaneously felt at the bit 120. Instead, the flexion of the flexion assembly allows the torque to build up more slowly or in an extended manner, which will reduce the likelihood of breakage of the bit 120.

Figure 2:
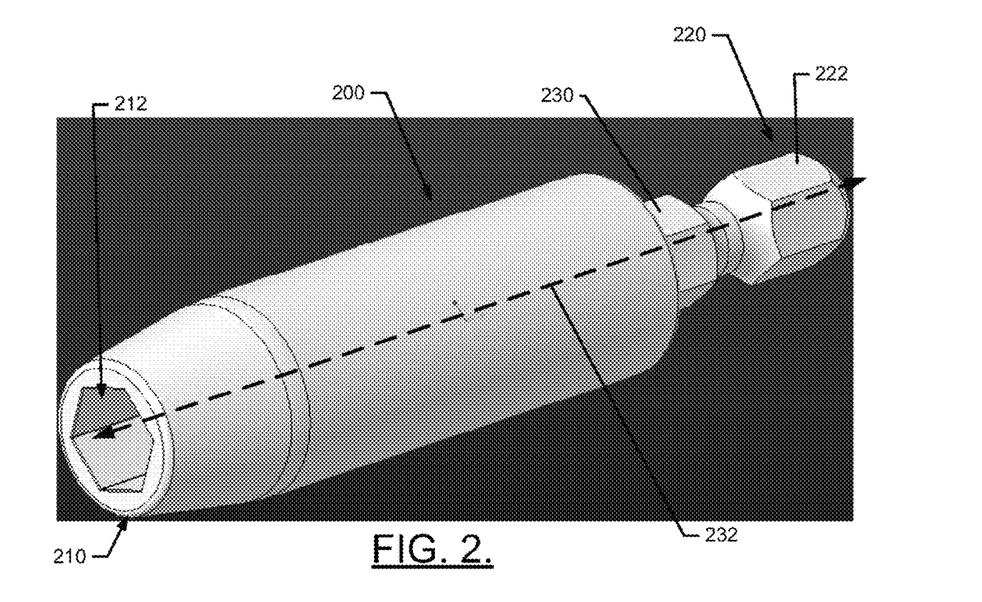
FIG. 2 illustrates a perspective view of a flexible torque transmission device in the form of flexible bit holder according to an example embodiment.

FIG. 2 illustrates a perspective view of a flexible torque transmission device in the form of flexible bit holder 200. The flexible bit holder 200 includes a drive body 210 having a receiving orifice 212 formed therein. The flexible bit holder 200 also includes a driven body 220 having a shank 222 that may be hex shaped, e.g., having the standard ¼ inch hex-shaped shank. The driven body 220 is driven by the driver (e.g., driver 110 or another driver). Torque applied by the driver to turn the driven body 220 is then transferred through the flexible bit holder 200 to the drive body 210, which receives a bit (e.g., bit 120 of FIG. 1) in the receiving orifice 212. As such, the receiving orifice 212 may be understood to be hex-shaped to accommodate the standard ¼ inch hex-shaped shank of the bit 120.

The shank 222 may be operably coupled to a core member 230 of the driven body 220 of the flexible bit holder 200. In this regard, the shank 222 and the core member 230 may, in some cases, be made from a single unitary piece of metal (e.g., steel or various alloys thereof) that forms the driven body 220. Moreover, the shank 222 and the core member 230 may share a common axis 232, which may form a longitudinal axis of the flexible bit holder 200. The receiving orifice 212 may also share the common axis 232 with the core member 230 and the shank 222. Thus, the drive body 210 and the driven body 220 may be coaxial with each other. In some cases, the receiving orifice 212 may also include a bit retainer 214 (see FIG. 9) disposed therein. The bit retainer 214 may engage (e.g., mechanically or magnetically) the bit to retain the bit within the receiving orifice 212 after the bit is inserted into the receiving orifice 212. In this example, the bit retainer 214 is a magnet disposed at a rear wall of the receiving orifice 212.

In an example embodiment, the drive body 210 and the driven body 220 may be operably coupled to each other via a flexion assembly. The flexion assembly may include one or more flexible bodies (e.g., made from plastic, resin, rubber, or other flexible materials) that are interposed between portions of the drive body 210 and the driven body 220 to couple the drive body 210 and the driven body 220 together. As such, torque applied to the driven body 220 may be transferred to the drive body 210 via the flexion assembly. Accordingly, when the driven body 220 is rotated responsive to an input torque applied by the driver, the flexion assembly may allow some rotation of the drive body 210 relative to the driven body 220 in order to extend the time it takes for the full amount of the input torque to be transmitted to the drive body 210 (and the bit). Thus, for example, although the driven body 220 turns instantaneously with the driver, and may experience the energy pulse immediately, the drive body 210 does not experience the energy pulse immediately as the flexion assembly dampens the energy transfer spike.

In an example embodiment, the flexion assembly may include components (e.g., the flexible bodies) that are configured (e.g., dimensioned) to deliver energy pulses introduced in the form of rotary percussions via the driven body 220 (by the driver) in an extended manner to the drive body 210. The delivery of the energy pulses to the drive body 210 in an extended manner in terms of time, angle, or dampening due to the flexing of the flexion assembly may ensure that torque peaks of energy pulses applied to the driven body 220 are below the static fracture torque of the bit (or portions thereof, such as the working tip). Fracture of or damage to the bit may therefore be avoided.

Figure 3:
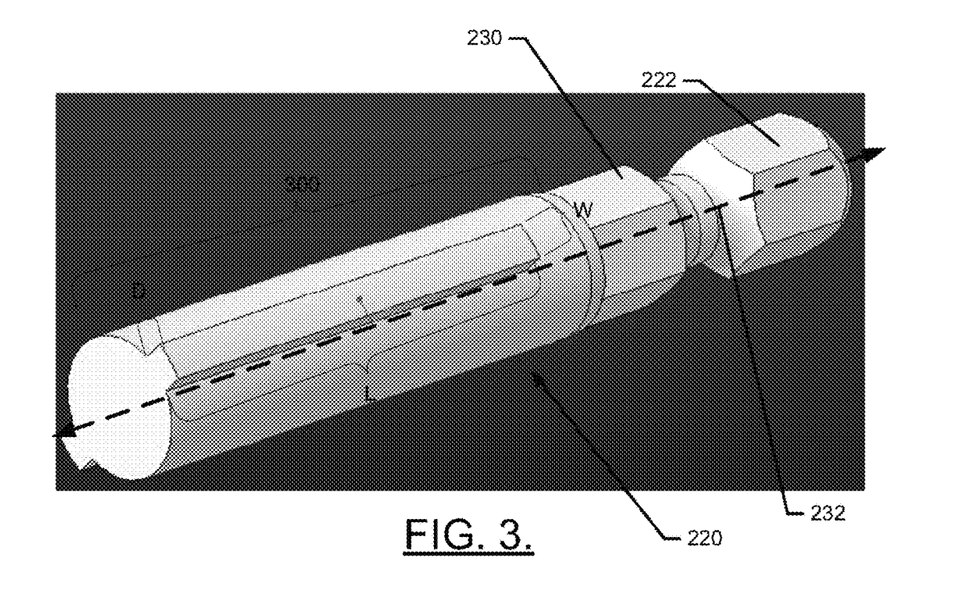
FIG. 3 illustrates a perspective view of a driven body of the flexible bit holder of an example embodiment in isolation.
Figure 4:
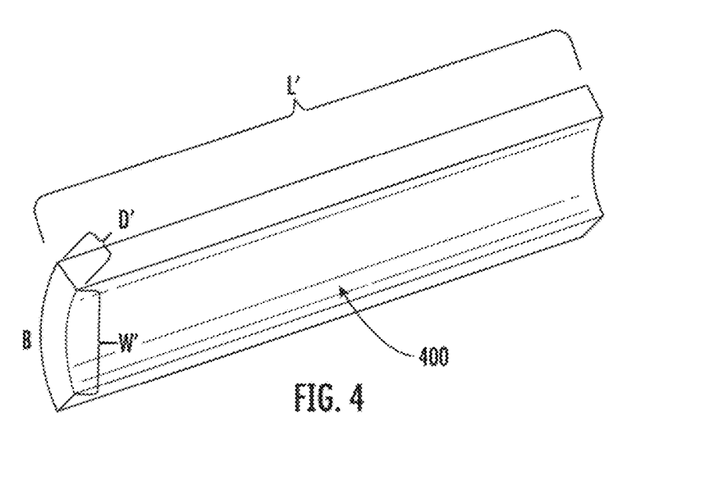
FIG. 4 illustrates a perspective view of a flex member in isolation according to an example embodiment.
Figure 5:
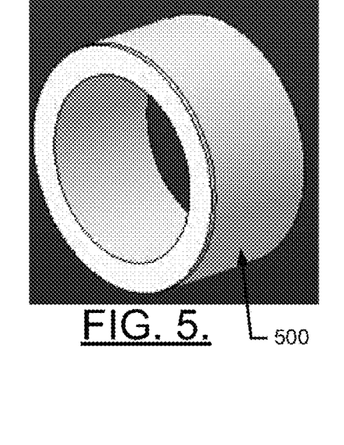
FIG. 5 illustrates a perspective view of a locking ring in isolation according to an example embodiment.
Figure 6:
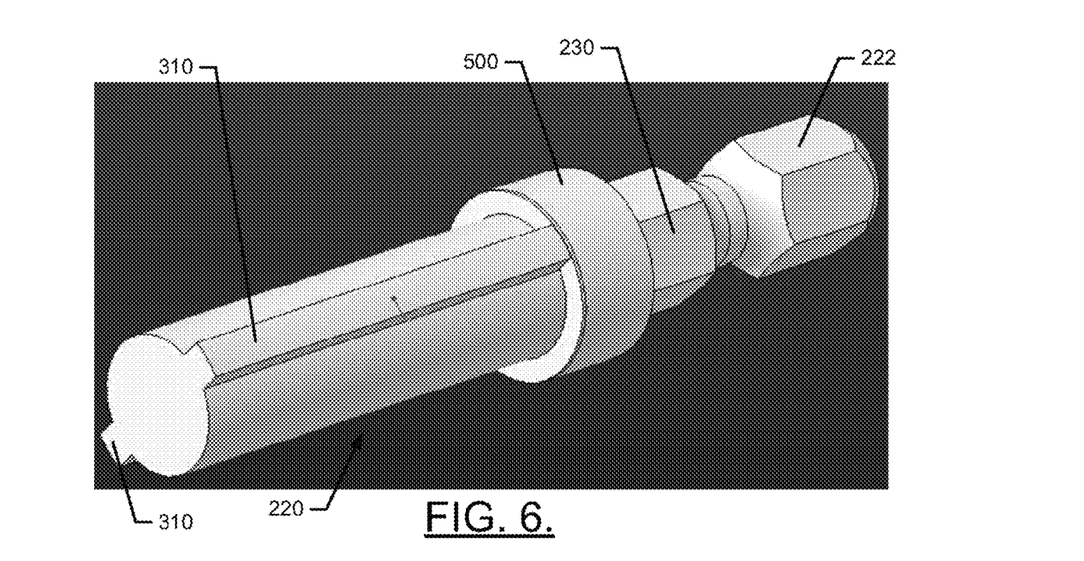
FIG. 6 illustrates a perspective view of the driven body having the locking ring installed thereon according to an example embodiment.
Figure 7:
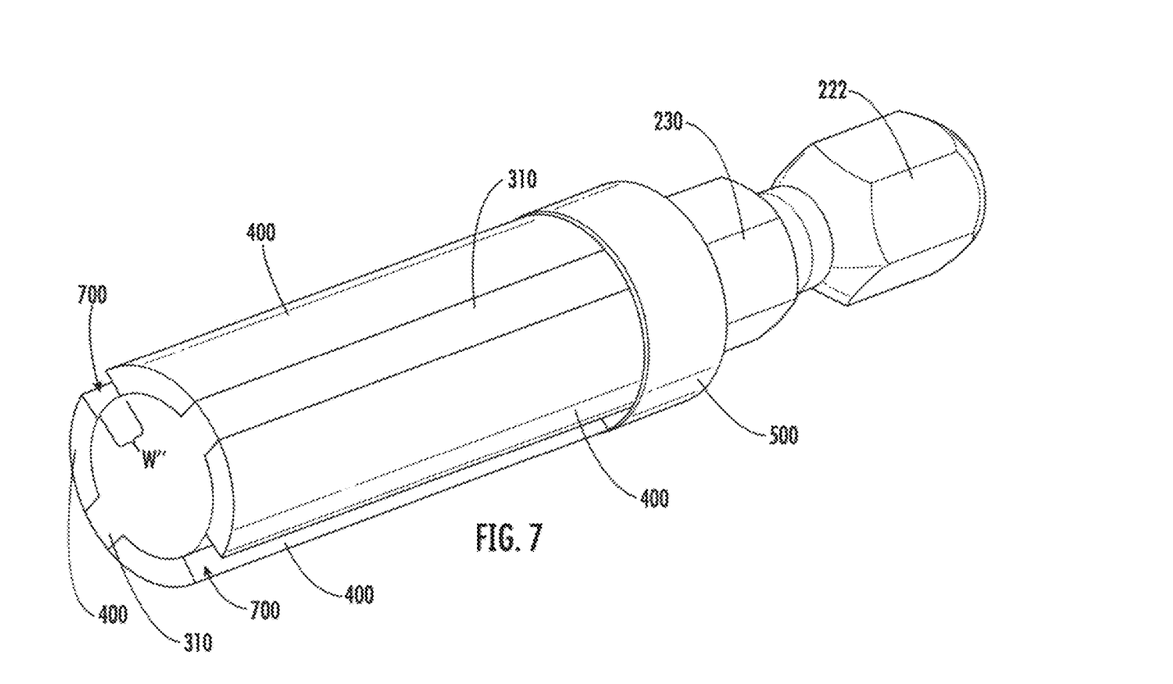
FIG. 7 illustrates a perspective view of the driven body with both the locking ring and the flex members installed thereon according to an example embodiment.
Figure 8:
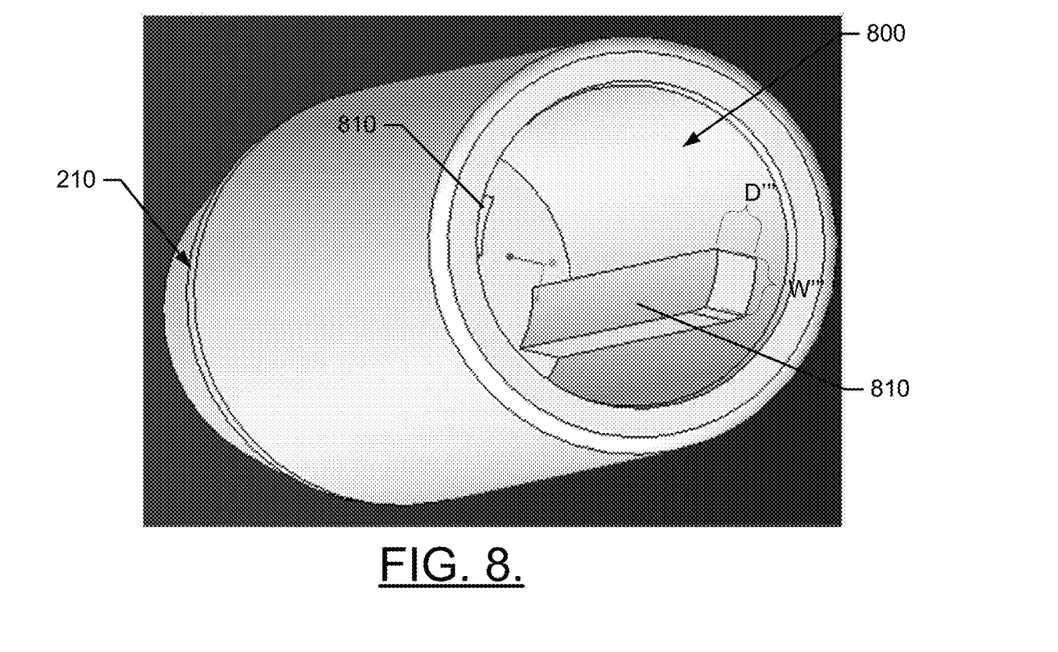
FIG. 8 illustrates a perspective view of the drive body in isolation in accordance with an example embodiment.
Figure 9:
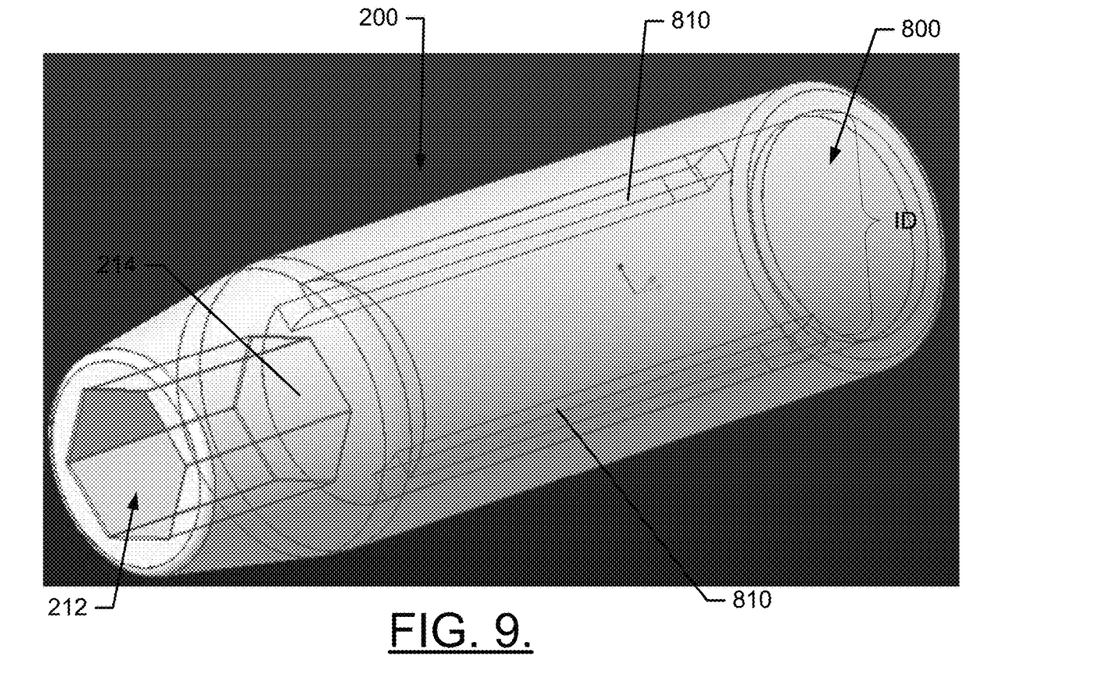
FIG. 9 illustrates the drive body with the internal components thereof being outlined to get a sense of how they fit within the drive body according to an example embodiment.

Components that comprise the flexible bit holder 200 of an example embodiment are shown in FIGS. 3-8. In this regard, FIG. 3 illustrates a perspective view of the driven body 220 of an example embodiment in isolation. Meanwhile, FIGS. 4 and 5 illustrate perspective views of various components of the flexion assembly in isolation. FIGS. 6 and 7 illustrate the components of FIGS. 4 and 5 inserted onto the driven body. FIG. 8 illustrates a perspective view of the drive body 210 in isolation. Finally, FIG. 9 illustrates the drive body 210 with the internal components thereof being outlined to get a sense of how they fit within the drive body 210.

Referring now to FIGS. 3-9, the core member 230 may include a torque transfer portion 300 that extends from a distal end thereof (relative to the shank 222) toward the shank 222. The torque transfer portion 300 may be substantially cylindrical and coaxial with the common axis 232. However, the torque transfer portion 300 may include torque transfer ridges 310 that extend radially outwardly from the outer surface of the torque transfer portion 300. In an example embodiment, the torque transfer ridges 310 may have a width (W) that is similar to or even equal to a depth (D) measured from the radially external surface of the torque transfer ridges 310 to the surface of the torque transfer portion 300. However, in some cases, the width (W) may be larger than the depth (D) (or vice versa) by an amount such as 10% to 50%. The torque transfer ridges 310 may also extend substantially parallel to the common axis 232 over a majority of the length of the core member 230 toward the shank 222. Thus, a length (L) of the torque transfer ridges 310 may be many times larger than the width (W) and/or the depth (D) of the torque transfer ridges 310.

In this example, two torque transfer ridges 310 are provided. However, more or fewer torque transfer ridges 310 could be employed in other embodiments. Thus, for example, as few as one torque transfer ridge 310 could be employed, or more than two such ridges could be employed. In this example in which there are two torque transfer ridges 310, the torque transfer ridges 310 may be disposed on opposing lateral sides of the torque transfer portion 300. As such, the torque transfer ridges 310 may be symmetrically located on the torque transfer portion 300. The torque transfer ridges 310 may abut or otherwise interface with a flex member 400, an example of which is shown in isolation in FIG. 4, on each opposing lateral side thereof. Thus, for example, one instance of the flex member 400 may abut each opposing side surface of the torque transfer ridges 310. Each instance of the flex member 400 may have a depth (D') that is substantially equal to the depth (D) of the torque transfer ridges 310. Thus, when situated next to each other, the outer surfaces of the torque transfer ridges 310 and the flex members 400 may form a substantially smooth outer surface (as shown in FIG. 7). The length (L') of the flex members 400 may be about equal to the length (L) of the torque transfer ridges 310. Finally, an inner width (W') of the flex members 400 may be about ¼ of the circumference of the cylindrical portion of the core member 230 minus the width (W) of the torque transfer ridges 310. This means that when one of the flex members 400 is abutted against each opposing lateral side of each of the torque transfer ridges 310, a gap is formed between distal lateral edges (relative to the proximal edge that contacts the torque transfer ridge 310) of adjacent flex members 400. The gap forms a receiving slot 700 that is visible in FIG. 7. The width (W") of the receiving slot 700 is substantially equal to the width (W) of the torque transfer ridges 310.

In an example embodiment, a locking ring 500 may be disposed between the proximal end of the torque transfer ridges 310 (relative to the shank 222) and the shank 222. In an example embodiment, the locking ring 500 may have an annular shape with an internal diameter that is substantially equal to an external diameter of the torque transfer portion 300. The locking ring 500 may have an external diameter that is substantially equal to the diameter of the torque transfer portion 500 plus the depth (D) of the torque transfer ridges 310. Thus, for example, a depth or thickness of the locking ring 500 (measured in the radial direction) may be about equal to the depth (D) of the torque transfer ridges 310 (or slightly larger).

In an example embodiment, the locking ring 500 may be press fit between the drive body 210 and the driven body 220 to prevent axial motion (and therefore separation) between the drive body 210 and the driven body 220. Adhesives, pins or other retaining members may also be used to enhance the holding power of the press fitting. Moreover, although not visible in FIG. 5, it should be appreciated that one or more annular rings, ridges and/or complementary valleys may be provided on the drive body 210, the driven body 220 and/or the locking ring 500 in order to facilitate locking of the components together in a press fit. In some cases, the locking ring 500 may be locked to only one of the drive body 210 and the driven body 220, and may be slidable (or have a certain amount of play or freedom of movement) relative to the other. FIG. 6 illustrates the locking ring 500 arranged on the core member 230 and ready for the flex members 400 to be applied to the core member 230 (i.e., next to each respective one of the torque transfer ridges 310). FIG. 7 illustrates the flex members 400 installed onto the core member 230 to form the receiving slots 700.

FIG. 8 illustrates the drive body 210, and shows a perspective view of a cavity 800 formed in an end portion of the drive body 210 that is opposite the end in which the receiving orifice 212 is formed. Meanwhile, FIG. 9 shows an outline of the internal components of the drive body 210. An internal diameter (ID) of the cavity 800 is about equal to (but slightly larger than) an external diameter of the combined assembly shown in FIG. 7 (i.e., a diameter of the core member 230 plus the depth (D) of each of the torque transfer ridges 310). Extending inwardly from the inner surface of the cavity 800, the drive body 210 may include drive ridges 810. The drive ridges 810 may have a width (W'") that is about equal to the width (W") of the receiving slot 700. The depth (D'") of the drive ridges 810 may also be about equal to the depth (D) of the torque transfer ridges 310 (which corresponds to the depth of the receiving slot 700 as well). The drive ridges 810 may have a length about equal to the length (L) of the torque transfer ridges 310, and may also extend inwardly from opposite sides of the inside of the cavity 800 (and therefore be symmetrical therein).

As can be appreciated from FIGS. 3 and 6-9, the inwardly extending (i.e., lateral) sides of the drive ridges 810 and the torque transfer ridges 310 may be formed to have about a 90-degree angle (+/− about 5 degrees) formed relative to the base surfaces from which they extend. Forming these steep angles, and therefore nearly parallel planar surfaces relative to each other may be useful in ensuring that the flex members 400 stay fully interposed therebetween and are not able to slip past either the drive ridges 810 or the torque transfer ridges 310 to cause ineffective operation of the flexible bit holder 200. Moreover, it should be appreciated that although the examples shown include two instances of each of the drive ridges 810 and the torque transfer ridges 310 alternative embodiments may include more such ridges (and flex members therebetween). It should also be appreciated that example embodiments work equally well when the driven body 220 receives clockwise turning or counter-clockwise turning energy pulses in terms of the ability of the flexion assembly to absorb shocks generated by such pulses. In an example embodiment, the flex members 400 may be configured to absorb between about 0 lb/ft and 100 lb/ft of torque during operation.

Accordingly, during assembly for example, the drive ridges 810 may be aligned with the receiving slots 700 and the drive body 210 may be slid into the receiving slots 700 as the drive body 210 and the driven body 220 are compressed toward each other along the common axis 232. When the press fitting of the locking ring 500 is engaged, the driven body 220 and drive body 210 may be effectively mated together in the axial direction. Meanwhile, the drive ridges 810 and the torque transfer ridges 310 may be positioned relative to each other so that rotation of the torque transfer ridges 310 is communicated to the drive ridges 810 via the flex members 400.

Thereafter, movement of the driven body 220 (responsive to torque applied by the driver) will be transmitted to the flex members 400 via the torque transfer ridges 310. The flex members 400 may be compressed against the drive ridges 810 that are inserted into the receiving slot 700. Since the material used for the flex members 400 is a polymer, rubber, plastic, or a flexible resin or other such materials, the flex members 400 may allow relative movement between the driven body 220 and the drive body 210 during the torque transfer process. The relative movement may be relatively small in some cases (e.g., between about 15 degrees to about 30), but generally at least 5 degrees of relative motion is required for sufficient dampening. However, larger amounts of movement (e.g., as much as 90 degrees) is possible in other embodiments. Thus, it should be appreciated that the flex members 400 could be replaced (or augmented) with the inclusion of metal coil springs, torsion springs, a horse-shoe shaped spring, and/or the like in alternative embodiments. In general, any material or component that can absorb some initial shock from energy pulses and then spring back may be used in alternative embodiments. When polymeric materials are employed, a hardness of between about 60 Shore A and 72 Shore D may be employed.

As such, the flex members 400 may dampen any torque pulses to extend the time over which the energy is delivered to the drive body 210 responsive to such pulses being received at the driven body 220. Thus, for example, if the driven body 220 receives a prompt jump or pulse of torque, the same maximum torque may ultimately be delivered to the drive body 210, but it will take longer for the maximum torque to be achieved. A square wave input torque may therefore be dampened so that the leading edge of the torque input curve is less steep. The inclusion of the flex assembly (e.g., the flex members 400 and locking ring 500 of the example described above) may extend the life of standard bits, particularly when such bits are used with an impact driver. Moreover, even lower quality bits may have increased life expectancies when such bits are used with the flexible bit holder 200 of an example embodiment.

Figure 10:
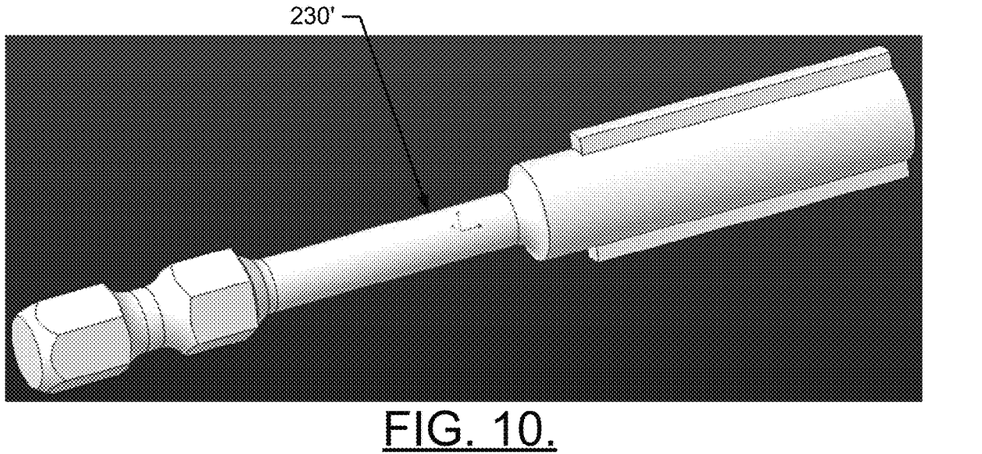
FIG. 10 illustrates a driven body with a longer length according to an example embodiment.

In an example embodiment, the dimensions of the drive body 210 and the driven body 220 can be extended or shortened to achieve desired design objectives. FIG. 10 illustrates an elongated core member 230' to show how scaling of the dimensions of the driven body 220 can be achieved in some cases.

Figure 11:
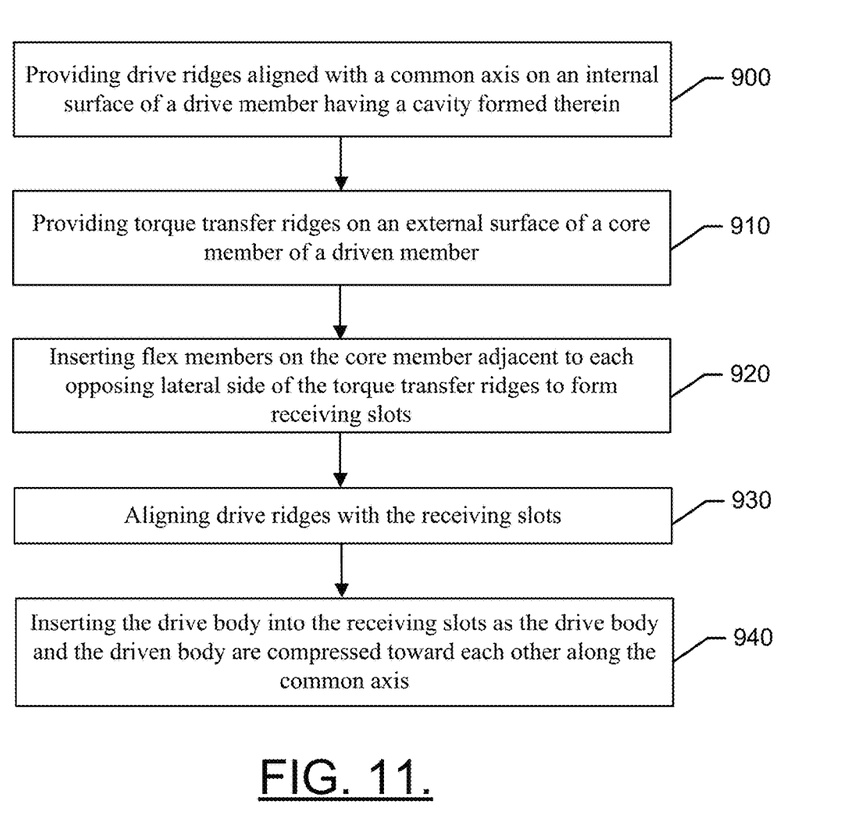
FIG. 11 illustrates a block diagram of a method of providing an improved bit holder according to an example embodiment.

FIG. 11 illustrates a block diagram of a method of providing an improved bit holder in accordance with an example embodiment. In this regard, the method may include providing drive ridges aligned with a common axis on an internal surface of a drive body having a cavity formed therein at operation 900. The method may further include providing torque transfer ridges on an external surface of a core member of a driven body at operation 910. At operation 920, flex members may be inserted on the core member adjacent to each opposing lateral side of the torque transfer ridges to form receiving slots. The drive ridges may be aligned with the receiving slots at operation 930 and the drive body may be slid into the receiving slots as the drive body and the driven body are compressed toward each other along the common axis at operation 940. The insertion (or sliding) may occur until the drive body and driven body are fixed in axial position relative to each other.

Figure 12:
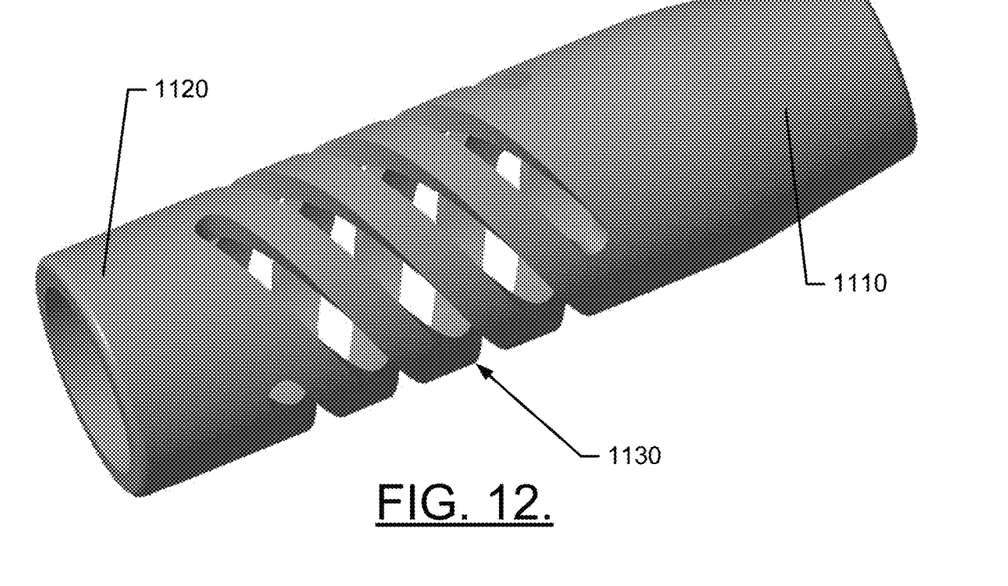
FIG. 12 illustrates a perspective view of an improved bit holder employing a flexible member made of metallic material in the form of a coil spring in accordance with an example embodiment.
Figure 13:
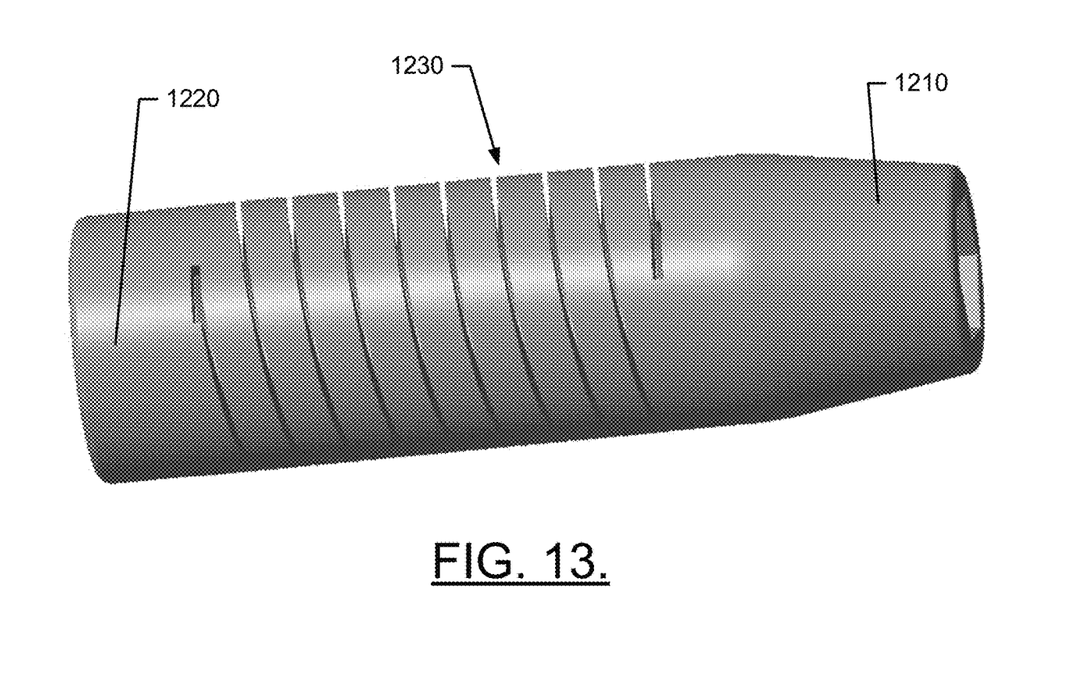
FIG. 13 illustrates a perspective view of another improved bit holder employing a flexible member made of metallic material in the form of a torsion spring in accordance with an example embodiment.
Figure 14:
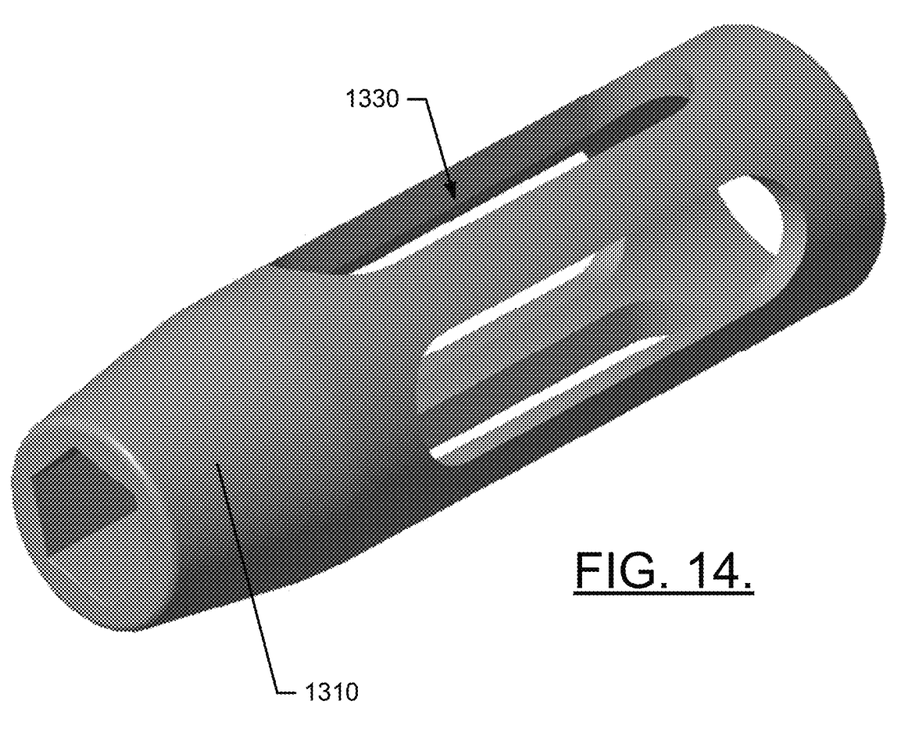
FIG. 14 illustrates another metallic drive member that may be used to interface with a metallic flexion assembly in accordance with an example embodiment.

As should be appreciated from the description, the flexion assembly can be embodied as a flexible material inserted between components of the drive body 210 and the driven body 220. Although the flexible material shown in the examples of FIGS. 3-8 is rubber, resin, plastic or the like, other flexible materials (including metals) may be used in some cases. In this regard, as noted above, the flex members 400 could be replaced by springs in alternative embodiments. FIGS. 12 and 13 show alternative embodiments including springs. In this regard, FIG. 12 illustrates a drive body 1110 and a driven body 1120 operably coupled to each other by flexion assembly 1130, and FIG. 13 illustrates a drive body 1210 and driven body 1220 operably coupled to each other by flexion assembly 1230. In each case, the flexion assembly (1130 or 1230) forms a spring that can become loaded in response to movement of the driven body 1120 or 1220 to dampen energy spikes applied thereto by a driver. Thus, the energy spikes may not be immediately transmitted, but may slowly build up at the drive body 1110 and 1210. Meanwhile, FIG. 14 illustrates an example of a metallic drive body 1310 having gaps 1330 formed therein. A portion of the driven body may interface with a spring or other flexible member within each of these gaps 1330 to form a flexion assembly in another alternative embodiment.

Thus, according to an example embodiment, a flexible bit holder may be provided. The flexible bit holder may include a drive body having a receiving orifice formed therein, a drive body having a shank and a flexion assembly. The receiving orifice may be configured to receive a bit, and the shank may be configured to interface with a driver to receive rotational energy from the driver. The flexion assembly may be disposed between at least a portion of the drive body and the driven body to operably couple the drive body and driven body. The flexion assembly may be configured to transfer torque applied to the driven body by the driver to the drive body. The flexion assembly may be formed of flexible material such that the drive body is rotatable relative to the driven body about a common axis of the drive body and the driven body.

In some embodiments, the flexible bit holder may be configured to include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, the shank may include a standard ¼ inch hex-shaped shank. In an example embodiment, the flexion assembly may include a plurality of flex members, and each of the flex members may include a polymer, rubber or plastic material. In some cases, the driven body may include a core member integrally formed with the shank along the common axis, and the core member may include torque transfer ridges having a length extending substantially parallel to the common axis and a depth extending radially outwardly from an external surface of the core member. In an example embodiment, a first lateral side of each of the flex members may be abutted against a corresponding lateral edge of the torque transfer ridges, and a second lateral side of each of the flex members may be spaced apart from another one of the flex members to form a receiving slot therebetween. In some cases, the drive body may include a cavity facing away from the receiving orifice, the cavity may include drive ridges having a depth extending inwardly from an inside surface of the cavity, and a length of the drive ridges may extend substantially parallel to the common axis. In an example embodiment, at least one of the drive ridges may be configured to fit within the receiving slot. In some cases, the drive ridges and torque transfer ridges may extend substantially parallel each other on opposite sides of the flex members and torque transfer from the torque transfer ridges to the drive ridges is dampened by compression or loading of the flex members. In an example embodiment, the flexion assembly may further include a locking ring operably coupling the drive body to the driven body and axially fixing the drive body relative to the driven body. In some cases, the locking ring may be press fit between the drive body and the driven body. In an example embodiment, the flex members have a hardness of about 60 Shore A and 72 Shore D. In some cases, the flexion assembly may be configured to provide between about 5 degrees and 90 degrees of motion about the common axis between the drive body and the driven body. In an example embodiment, the flexion assembly may be configured to provide between about 15 degrees and 30 degrees of motion about the common axis between the drive body and the driven body. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A flexible bit holder configured for rotation about a common axis, the flexible bit holder comprising:
a drive body having a receiving orifice formed therein, the receiving orifice being configured to receive a bit, the drive body comprising a cavity comprising drive ridges extending substantially parallel to the common axis and extending inwardly from an inside surface of the cavity by a first depth;
a driven body comprising a core member and a shank, the shank being configured to interface with a driver to receive rotational energy from the driver, the core member comprising torque transfer ridges extending substantially parallel to the common axis and extending radially outwardly from an external surface of the core member by a second depth; and
a flexion assembly disposed between at least a portion of the drive body and the driven body to operably couple the drive body and driven body, the flexion assembly being configured to transfer torque applied to the driven body by the driver to the drive body,
wherein the flexion assembly comprises a plurality of flex members, each flex member having a third depth and each flex member being formed of flexible material such that the drive body is rotatable relative to the driven body about the common axis of the drive body and the driven body;
wherein a first lateral side of each of the flex members is abutted against a corresponding lateral edge of one of the torque transfer ridges, and wherein a second lateral side of each of the flex members is abutted against a corresponding lateral edge of one of the drive ridges;
wherein the first depth, the second depth, and the third depth are equal.

2. The flexible bit holder of claim 1, wherein the shank comprises a standard ¼ inch hex-shaped shank.

3. The flexible bit holder of claim 1, wherein each of the flex members comprises a polymer, rubber, or plastic material.

4. The flexible bit holder of claim 1, wherein the core member integrally formed with the shank along the common axis.

5. The flexible bit holder of claim 1, wherein an opening of the cavity of the drive body faces away from the receiving orifice.

6. The flexible bit holder of claim 1, wherein torque transfer from the torque transfer ridges to the drive ridges is dampened by compression or loading of the flex members.

7. The flexible bit holder of claim 1, wherein the flexion assembly further comprises a locking ring operably coupling the drive body to the driven body and axially fixing the drive body relative to the driven body.

8. The flexible bit holder of claim 1, wherein the flex members have a hardness value within a range of about 60 Shore A to 72 Shore D.

9. The flexible bit holder of claim 1, wherein the flexion assembly is configured to provide between about 5 degrees and 90 degrees of motion about the common axis between the drive body and the driven body.

10. The flexible bit holder of claim 1, wherein the flexion assembly is configured to provide between about 15 degrees and 30 degrees of motion about the common axis between the drive body and the driven body.

11. The flexible bit holder of claim 1, wherein the flexion assembly further comprises a locking ring operably coupling the drive body to the driven body and axially fixing the drive body relative to the driven body;
wherein the locking ring is press fit between the drive body and the driven body.

12. The flexible bit holder of claim 1, wherein the corresponding lateral edges of the drive ridges are formed to extend at about a 90-degree angle relative to the inside surface of the cavity;
wherein the corresponding lateral edges of the torque transfer ridges are formed to extend at about a 90-degree angle relative to the external surface of the core member.

13. A flexible bit holder comprising:
a drive body having a receiving orifice formed therein, the receiving orifice being configured to receive a bit;
a driven body having a shank, the shank being configured to interface with a driver to receive rotational energy from the driver; and
a flexion assembly disposed between at least a portion of the drive body and the driven body to operably couple the drive body and driven body, the flexion assembly being configured to transfer torque applied to the driven body by the driver to the drive body;

wherein the flexion assembly is formed of flexible material such that the drive body is rotatable relative to the driven body about a common axis of the drive body and the driven body;

wherein the flexion assembly comprises a plurality of flex members, and wherein each of the flex members comprises a polymer, rubber or plastic material;

wherein the driven body comprises a core member integrally formed with the shank along the common axis, wherein the core member comprises torque transfer ridges having a length extending substantially parallel to the common axis and a depth extending radially outwardly from an external surface of the core member;

wherein a first lateral side of each of the flex members is abutted against a corresponding lateral edge of the torque transfer ridges, and wherein a second lateral side of each of the flex members is spaced apart from another one of the flex members to form a receiving slot therebetween;

wherein the drive body comprises a cavity facing away from the receiving orifice;

wherein the cavity includes drive ridges having a depth extending inwardly from an inside surface of the cavity;

wherein a length of the drive ridges extends substantially parallel to the common axis;

wherein at least one of the drive ridges is configured to fit within the receiving slot;

wherein the drive ridges and torque transfer ridges extend substantially parallel each other on opposite sides of the flex members and torque transfer from the torque transfer ridges to the drive ridges is dampened by compression or loading of the flex members;

wherein the flexion assembly further comprises a locking ring operably coupling the drive body to the driven body and axially fixing the drive body relative to the driven body;

wherein the locking ring is press fit between the drive body and the driven body.

14. A bit holder configured for rotation about a common axis, the bit holder comprising:
   a drive body comprising:
      a receiving orifice configured to receive a bit, and
      a cavity comprising a drive ridge extending inwardly from an inside surface of the cavity by a first depth;
   a driven body comprising:
      a core member comprising a torque transfer ridge extending radially outwardly from an external surface of the core member by a second depth, and
      a shank configured to interface with a driver to receive rotational energy from the driver; and
   a flex member formed of flexible material, the flex member having a third depth;
   wherein a first lateral side of the flex member is abutted against a corresponding lateral edge of the torque transfer ridge and a second lateral side of the flex member is abutted against a corresponding lateral edge of one of the drive ridge;
   wherein the first depth, the second depth, and the third depth are equal.

15. The bit holder of claim 14, wherein the flex members comprises a polymer, rubber, or plastic material.

16. The bit holder of claim 14, further comprising a locking ring operably coupling the drive body to the driven body and axially fixing the drive body relative to the driven body;
   wherein the locking ring is press fit between the drive body and the driven body.

* * * * *